(No Model.)  2 Sheets—Sheet 1.

J. F. APPLEBY.
KNOTTING MECHANISM FOR GRAIN BINDERS.

No. 315,216.  Patented Apr. 7, 1885.

Witnesses:
R. C. Howes
M. L. Adams

Inventor:
John F. Appleby,
Per Edw. E. Quimby,
Atty.

(No Model.) 2 Sheets—Sheet 2.
J. F. APPLEBY.
KNOTTING MECHANISM FOR GRAIN BINDERS.
No. 315,216. Patented Apr. 7, 1885.
Figure 5.
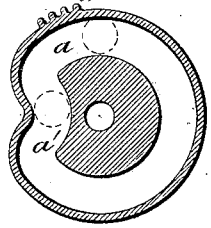
Figure 6.
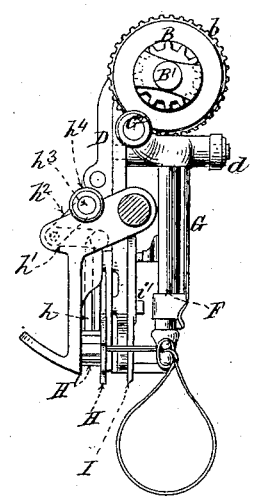
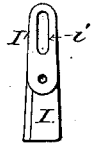
Figure 7.
Figure 8.
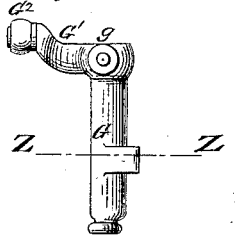
Figure 9.
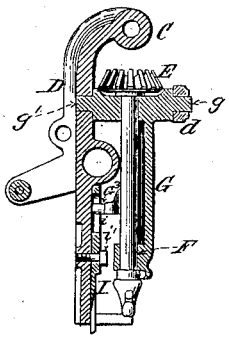
Figure 10.
Witnesses:
R. C. Howes
M. L. Adams
Inventor:
John F. Appleby,
Per Edw. E. Quimby,
Atty.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

KNOTTING MECHANISM FOR GRAIN-BINDERS.

SPECIFICATION forming part of Letters Patent No. 315,216, dated April 7, 1885.

Application filed January 7, 1884. (No model.)

*To all whom it may concern:*

Be it known that I, JOHN F. APPLEBY, of Minneapolis, Minnesota, have invented a certain Improvement in Knotting Mechanism for Grain-Binders, of which the following is a specification.

My improvement relates to knotting mechanism of the type in which a single cam-groove on the knotter-operating wheel serves to operate the cord-gripping device, and also to impart a lateral movement to the knotter after the knot is partially formed, whereby the binding-cord is severed and the formation of the knot is completed, and the knot stripped from the knotter-hook.

My present invention consists in the employment of the same cam-groove which operates the cord-gripping disk and gives the lateral movement to the knotter for the performance of the additional function of imparting the required motion to a movable knife for severing the binding-cord.

Figure 1:
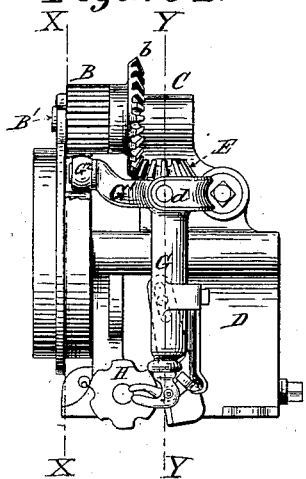
Figure 2:
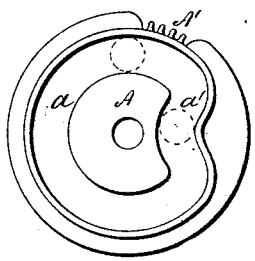
Figure 3:
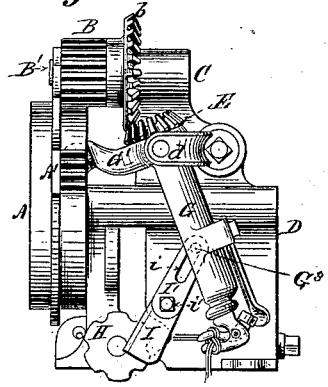
Figure 4:
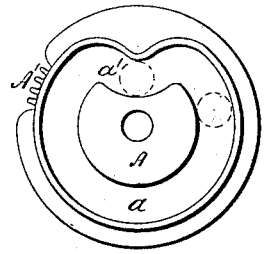

The accompanying drawings, illustrating knotting mechanism embodying my invention, are as follows:

Figure 1 is an elevation of the side of the knotting mechanism which is toward the grain-platform. Fig. 2 is a face view of the cam and gear wheel, showing the position which it occupies just before the engagement of the segmental rack upon its periphery with the pinion upon the counter-shaft by which motion is transmitted to rotate the knotter. Fig. 3 is an elevation similar to Fig. 1, showing the knotter-shaft in the inclined position in which it has been moved by the rotation of the cam and gear wheel to the position in which the latter is represented in Fig. 4. Fig. 5 is a vertical section taken through the line X X on Fig. 1, with the cam and gear wheel removed, the latter being shown in section in the same plane in Fig. 6. Fig. 7 is an elevation of the movable knife or cutter. Fig. 8 is a vertical section through the line Y Y on Fig. 1, showing the knotter-shaft in elevation. Fig. 9 is an elevation of the rocking arm in which the knotter-shaft has its bearings. Fig. 10 is a transverse section of the arm which carries the knotter-shaft, taken through the line Z Z on Fig. 9.

The drawings represent knotting mechanism which is entirely operated by the cam and gear wheel A, having formed upon its periphery the toothed rack A', the teeth of which mesh into the pinion B, affixed to the horizontal stub-shaft B', having its bearing in the box C at the top of the standard D. A bevel-wheel, $b$, is also affixed to the counter-shaft B', the teeth of which engage the teeth of the pinion E, affixed to the upper end of the knotter-shaft F. The knotter-shaft has its bearings in the swinging arm G, which is provided at the top with the laterally-projecting trunnions $g$ and $g'$, having their bearings, respectively, in the standard D and the horizontal elbow $d$, bolted to the standard D. An arm, G', projecting radially from the trunnion $g$, carries upon its end the anti-friction roller $G^2$, which is adapted to be engaged by the cam-groove $a$, formed in the face of the knotter-operating cam and gear wheel A. The cam and gear wheel A makes one revolution during the performance of each knotting operation, and in so doing, by means of the rack A', at the proper time causes the knotter-shaft to make one revolution upon its longitudinal axis, immediately after which the arm G' is rocked downward by the action of the eccentric part $a'$ of the cam-groove $a$ upon the friction-roller $G^2$, and thus the arm G, carrying the knotter-shaft, is rocked outward from the vertical position which it has occupied during the rotation of the knotter-shaft into the inclined position shown in Fig. 3. The shaft of the gripping-disk H has its bearing in the standard D, and has affixed to it the usual ratchet-wheel, H', for engagement with the impelling-pawl $h$, to which the necessary reciprocating motion is given by means of the bell-crank lever $h'$, one arm, $h^2$, of which is provided with a crank-pin, $h^3$, inserted through the anti-friction roller $h^4$, which is engaged by the cam-groove $a$, and which is rocked to and fro at the proper time by the eccentric part $a'$ of the cam-groove. In rocking outward from its vertical position the arm G rocks the knife I in the contrary direction. This is effected by the engagement of the pin $G^3$, projecting laterally from the arm G and engaging the slot $i$, formed in the upper half, I', of the knife-plate. The knife is provided with a horizontal axis of oscillation by means of the pin $i'$, inserted transversely through the knife into the standard D. It will thus be seen that a single cam-groove operates the cord-gripping device and imparts the required lateral movement to the knotter, and also the movement to the movable knife, whereby the binding-cord, after the knot has been partially formed by the rotation of the knotter, is severed by the movable knife between the gripping-disk and the knotter as the latter swings outward for the purpose of stripping the knot from the knotter-bill.

I claim as my invention—

In a grain-binder, the combination, with the knotter cam and gear wheel and the mechanism for gripping the binding-cord, of a movable knife for severing the binding-cord between the cord-gripping mechanism and the knotter, the laterally-swinging knotter, and a single cam for actuating the cord-gripping mechanism and the movable knife, and the mechanism for swinging the knotter and thereby disengaging it from the loop, as described.

JOHN F. APPLEBY.

Witnesses:
C. M. CASTLE,
HENRY HONKOMP.